United States Patent [19]

Stratton et al.

[11] Patent Number: 5,727,813
[45] Date of Patent: Mar. 17, 1998

[54] AIR BAG INFLATOR

[75] Inventors: Rickey Lee Stratton, Pontiac; Robert M. Krupp, Royal Oak; Chris A. Adamini, Sterling Heights; Paresh S. Khandhadia, Troy, all of Mich.

[73] Assignee: Automotive Systems Laboratory, Inc., Farmington Hills, Mich.

[21] Appl. No.: 700,819

[22] Filed: Aug. 21, 1996

[51] Int. Cl.⁶ .................................................. B60R 21/26
[52] U.S. Cl. ................................. 280/736; 280/742
[58] Field of Search ........................ 280/741, 742, 280/736

[56] References Cited

U.S. PATENT DOCUMENTS

| | | | |
|---|---|---|---|
| 4,419,902 | 12/1983 | Strasser et al. | 102/531 |
| 5,308,370 | 5/1994 | Kraft et al. | 280/736 |
| 5,345,875 | 9/1994 | Anderson | 102/530 |
| 5,378,015 | 1/1995 | Rink et al. | 280/736 |
| 5,397,543 | 3/1995 | Anderson | 422/165 |
| 5,466,420 | 11/1995 | Parker et al. | 280/736 |

*Primary Examiner*—Kenneth R. Rice
*Attorney, Agent, or Firm*—Lyon, P.C.

[57] ABSTRACT

A filter for an air bag inflator comprises juxtaposed layers of pierced sheet metal, wire cloth of a first relatively low mesh, ceramic filter media and wire cloth of relatively larger mesh in a radially outwardly extending array.

4 Claims, 2 Drawing Sheets

AIR BAG INFLATOR

BACKGROUND OF THE INVENTION

Heat, as well as particulates, in the combustion of gases produced by a pyrotechnic inflator of a vehicle occupant restraint system must be attenuated prior to discharge thereof into the passenger compartment of a vehicle. While the industry has been successful in meeting current standards through the use of azide propellants, the advent of a new class of non-azide propellants has complicated the problem due to high combustion temperatures and the characteristics of particulate combustion products produced by non-azide propellants. Thus, there is a requirement for an inflator that utilizes the many attributes of a non-azide propellant yet meets all current and projected standards for heat attenuation and particulate filtration from the gas produced.

SUMMARY OF THE INVENTION

The aforesaid problem is solved, in accordance with a preferred constructed embodiment of the present invention, by a right circular cylindrical multi-layered filter element that is disposed about propellant chamber of a conventional inflator housing. The filter comprises a novel array of pierced sheet metal, metallic wire cloth, and ceramic filtration media.

DETAILED DESCRIPTION OF THE PREFERRED EMBODIMENT(S)

Figure 1:
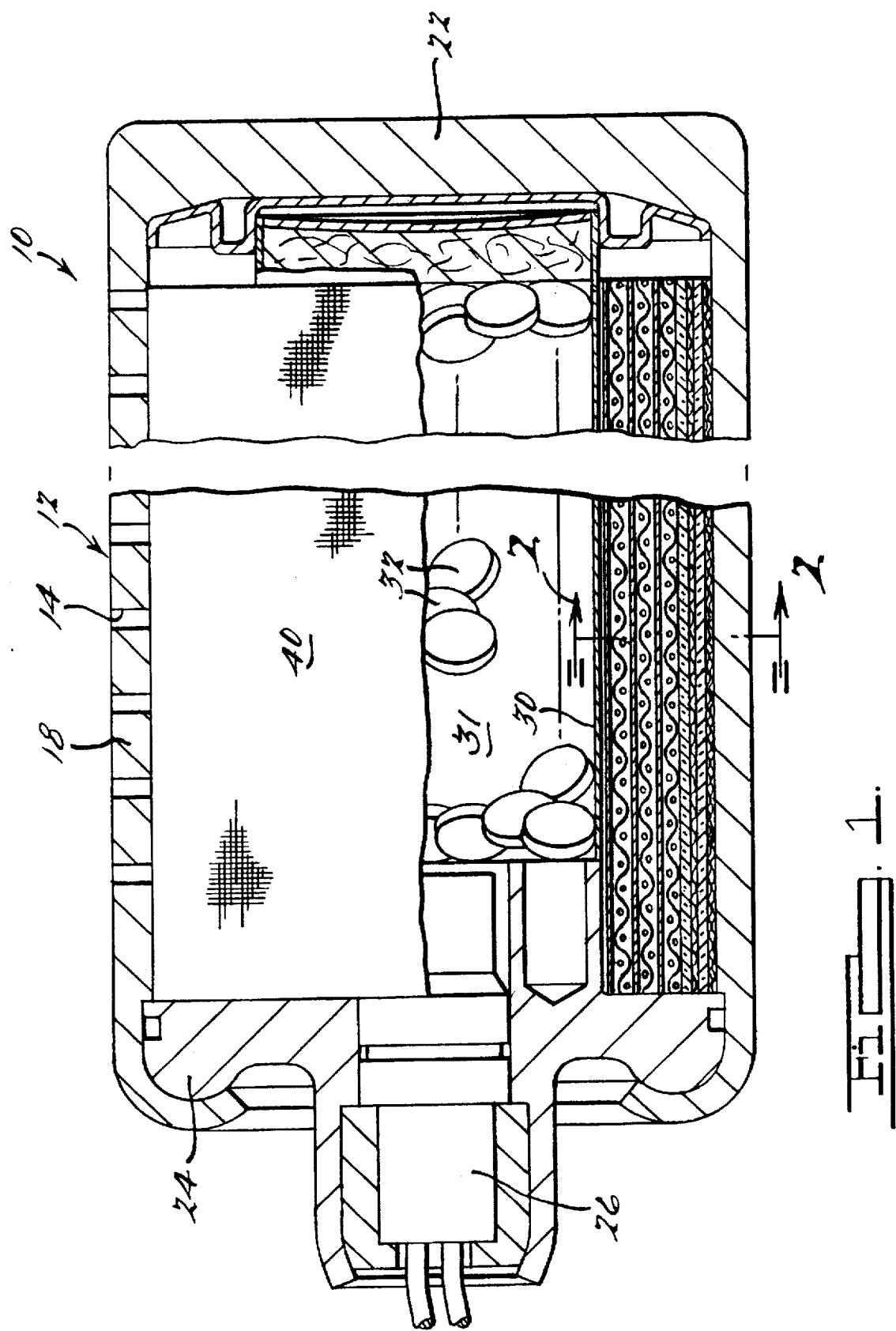
FIG. 1 is a sectional elevation of an automotive air bag inflator constructed in accordance with the instant invention.

As seen in FIG. 1 of the drawings, an inflator 10 having particular utility for use in, for example, an automobile occupant restraint system, comprises a cylindrical housing 12 having a plurality of gas discharge orifices 14 disposed in a radially outer wall 18. The housing 12 has an integral end closure 22 at one end and a closure 24 at an opposite end thereof that is crimped in place. The end closure 24 accepts a conventional igniter 26.

A perforate propellant tube 30 defines a propellant chamber 31 that extends longitudinally of the housing 12 for containment of non-azide propellant grains 32. Alternatively, the propellant chamber 31 can be defined a radially inner surface 34 of a right circular cylindrical multilayered filter 40.

In accordance with the present invention, the right circular cylindrical multi-layered filter 40 extends radially between the propellant chamber 31 and the outer wall 18 of the inflator housing 12.

Figure 2:
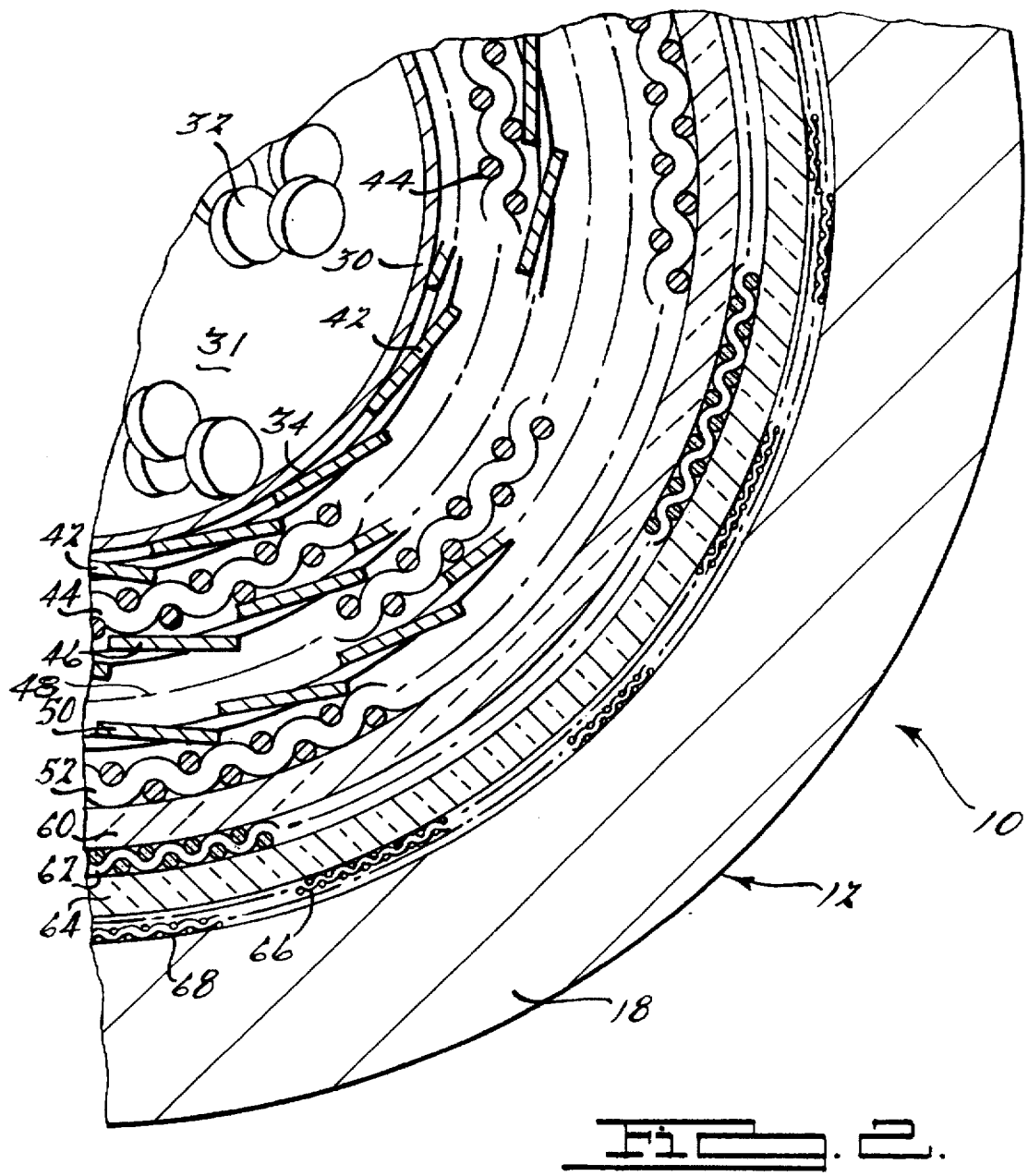
FIG. 2 is an enlarged view taken along the line 2—2 of FIG. 1.

As best seen in FIG. 2, the filter 40, in accordance with a preferred constructed embodiment of the invention, comprises a radially inner layer 42 of pierced 0.027 inch stainless steel sheet metal. Piercing of the sheet metal increases the total radial thickness thereof to 0.037 inches.

A first layer 44 of 16 to 20 mesh stainless steel wire cloth obtainable from, for example, Wayne Wire Cloth, Hillman, Mich., is disposed radially outwardly of the layer 42 of stainless steel sheet. A second layer 46 of pierced stainless steel sheet is disposed about the layer 44 of wire cloth. A second layer 48 of 16 to 20 mesh stainless steel wire cloth is disposed radially outwardly of said second layer 46 of pierced stainless steel sheet metal. A third layer 50 of pierced stainless steel sheet metal is disposed about the second layer 48 of wire cloth, and a third layer 52 of 16 to 20 mesh stainless steel wire cloth is disposed about said third layer 50 of pierced steel sheet.

In accordance with one feature of the invention, a layer of ceramic filter media 60, for example, Unifrax #204LE media obtainable from Unifrax Corporation, Niagara, N.Y., is disposed about the radially outer or third layer 52 of 16 to 20 mesh stainless steel wire cloth. A layer 62 of 50 mesh stainless steel wire cloth is disposed radially outwardly of the filter media 60. A second layer 64 of Unifrax 204LE ceramic filter media is disposed about the 50 mesh stainless steel wire cloth 62. Two layers 66 and 68 of 24×110 mesh stainless steel wire cloth are disposed about the media layer 64. The layer 68 of wire cloth comprises the radially outer surface of the filter 40.

The aforesaid layered construction of the filter 40 presents relatively course and heavy material to the high temperature gaseous products of combustion so as to function as a heat sink for the removal of heat and course particulates therefrom. Subsequently, relatively finer mesh wire cloth and the ceramic media effects the removal of fine particulates from the gas stream. Placement of the relatively fragile ceramic filter media radially outwardly of multiple layers of pierced sheet metal and 16–20 mesh wire cloth protects the media layers 60 and 64 from excess heat and impact of large particulate combustion products precluding rupture of the media layers 60 and 64. Because the filter 40 is of right circular cylindrical configuration, it is easily formed into an assembly as, for example, by rolling and welding as taught in U.S. Pat. No. 5,547,217, assigned to the assignee of the present invention.

In operation, combustion gas flows radially outwardly from propellant chamber 31, thence radially outwardly and circumferentially past the circumferentially directed, relatively large and flat surfaces of the radially inner sheet metal layer 42. The gases then pass through the 16–20 mesh wire cloth 44, past the flat surfaces of the layer 46 of sheet metal, through the wire cloth layer 48, past the flat surfaces of the layer 50 of pierced sheet metal. A significant portion of the heat of combustion, as well as the large particulates in the propellant 32, are absorbed and filtered by the aforesaid structure.

Thereafter, the relatively cool gas passes through the ceramic filter media 60, the 50 mesh wire cloth 62, the ceramic filter layer 64 and layers 66 and 68 of 24×110 mesh wire cloth, thence exits the inflator 10 through the apertures 14 in the radially outer wall 18 thereof.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. In an air bag inflator comprising an elongated cylindrical housing, a propellant chamber disposed centrally of said housing; a propellant in said chamber; and means for igniting said propellant at one end of said chamber;

an elongated cylindrical filter disposed radially outwardly of said propellant chamber and radially inwardly of the wall of said housing, said filter comprising a radially inner layer of pierced sheet metal, a layer of wire cloth of a first mesh disposed about said sheet metal layer, a ceramic filter media disposed about said wire cloth, and; a layer of wire cloth of a second mesh greater than the mesh of said first layer of wire cloth disposed radially outwardly of said ceramic filter media.

2. The inflator of claim 1 wherein said filter comprises a plurality of layers of pierced sheet metal and a plurality of layers of wire cloth disposed between said layers of sheet metal, respectively.

3. The inflator of claim 1 wherein said filter comprises a plurality of layers of ceramic filter media with a layer of wire cloth of said second mesh disposed therebetween.

4. The inflator of claim 1 wherein said filter comprises a third layer of wire cloth disposed radially outwardly of said ceramic filter media and of a mesh greater than the mesh of said second layer.

* * * * *